(12) United States Patent
Harada

(10) Patent No.: US 10,225,421 B2
(45) Date of Patent: Mar. 5, 2019

(54) IMAGE READING APPARATUS

(71) Applicant: SEIKO EPSON CORPORATION, Tokyo (JP)

(72) Inventor: Hidenori Harada, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/834,286

(22) Filed: Dec. 7, 2017

(65) Prior Publication Data

US 2018/0176398 A1 Jun. 21, 2018

(30) Foreign Application Priority Data

Dec. 19, 2016 (JP) ................................ 2016-245541

(51) Int. Cl.
*H04N 1/00* (2006.01)
*B65H 29/14* (2006.01)
(Continued)

(52) U.S. Cl.
CPC ........... *H04N 1/00543* (2013.01); *B65H 1/02* (2013.01); *B65H 1/022* (2013.01); *B65H 3/06* (2013.01); *B65H 3/063* (2013.01); *B65H 3/0653* (2013.01); *B65H 5/062* (2013.01); *B65H 29/14* (2013.01); *B65H 29/70* (2013.01); *B65H 31/02* (2013.01); *B65H 31/22* (2013.01); *H04N 1/00591* (2013.01); *H04N 1/00631* (2013.01); *B65H 2301/4212* (2013.01);
(Continued)

(58) Field of Classification Search
CPC ........... H04N 1/00543; H04N 1/00591; H04N 1/00631; H04N 2201/0081; B65H 29/14; B65H 2801/39; B65H 3/06; B65H 5/062; B65H 1/022; B65H 29/70; B65H 3/063; B65H 3/0653; B65H 31/02; B65H 31/22; B65H 1/02; B65H 2402/46; B65H 2402/343; B65H 2405/324; B65H 2405/1114; B65H 2405/11164; B65H 2511/12; B65H 2511/22; B65H 2301/4212; B65H 2301/51214
USPC ........................................................ 358/1.14
See application file for complete search history.

(56) References Cited

U.S. PATENT DOCUMENTS 5,341,202 A * 8/1994 Isobe .................... B41J 13/009
  347/130
2009/0263155 A1* 10/2009 Murano ............. G03G 15/2064
  399/107
(Continued)

FOREIGN PATENT DOCUMENTS

JP 2014-051338 3/2014

*Primary Examiner* — Allen H Nguyen
(74) *Attorney, Agent, or Firm* — Workman Nydegger

(57) ABSTRACT

The likelihood of a medium jamming is reduced or avoided during discharging media to a discharged-sheet receiving tray, and a plurality of media are appropriately discharged to, and stacked on, the discharged-sheet receiving tray. A scanner includes an apparatus body including a reading section that reads a sheet, a discharge roller pair that is provided inside the apparatus body and discharges the sheet after reads in the reading section, and a discharged sheet tray that receives the sheet being discharged by the discharge roller pair. The discharged sheet tray includes a first member that has at least a portion that is located inside the apparatus body. The first member is that supports the medium at a position higher than the placement surface of the discharged sheet tray.

12 Claims, 10 Drawing Sheets

(51) Int. Cl.
    *B65H 1/02*     (2006.01)
    *B65H 3/06*     (2006.01)
    *B65H 5/06*     (2006.01)
    *B65H 29/70*     (2006.01)
    *B65H 31/02*     (2006.01)
    *B65H 31/22*     (2006.01)

(52) U.S. Cl.
    CPC .............. *B65H 2301/51214* (2013.01); *B65H 2402/343* (2013.01); *B65H 2402/46* (2013.01); *B65H 2405/1114* (2013.01); *B65H 2405/11164* (2013.01); *B65H 2405/324* (2013.01); *B65H 2511/12* (2013.01); *B65H 2511/22* (2013.01); *B65H 2801/39* (2013.01); *H04N 2201/0081* (2013.01)

(56) References Cited

U.S. PATENT DOCUMENTS

| | | | |
|---|---|---|---|
| 2010/0053701 A1* | 3/2010 | Yoshida | H04N 1/00525 358/474 |
| 2013/0321508 A1* | 12/2013 | Sang | B41J 13/0009 347/16 |
| 2014/0035218 A1* | 2/2014 | Koyama | B65H 31/20 271/3.14 |
| 2014/0063573 A1 | 3/2014 | Yonemura et al. | |
| 2014/0291913 A1* | 10/2014 | Tamura | B65H 1/266 271/9.03 |

* cited by examiner

IMAGE READING APPARATUS

BACKGROUND

1. Technical Field

The present invention relates to an image reading apparatus that reads an image of a document.

2. Related Art

An example of an image reading apparatus is a scanner that is configured to include an automatic feeding device (otherwise called an ADF or Auto Document Feeder) that feeds a document, that is, a medium, so as to be able to automatically feed and read a plurality of documents. The documents are fed one by one to, and read by, an image reading section that is disposed downstream of the ADF.

Such a scanner may have a configuration in which the document is discharged from the apparatus into a discharged-sheet receiving tray (sometimes called "discharged sheet stacker") by a discharge roller pair that is provided downstream of the image reading section. The discharged-sheet receiving tray receives a plurality of documents and stacks them in the order that the documents are discharged.

For example, JP-A-2014-051338 discloses a scanner having a configuration in which sheets of paper are discharged from the apparatus by a second transport roller 140 and a second idler roller 141 that are provided downstream of a imaging section 130, which serves as the image reading section. The sheets are subsequently stacked on a discharged-sheet receiving tray that is formed of a front cover 105a, a top surface cover 105b, and an auxiliary cover 105c.

First, a problem associated with a known image reading apparatus will be described with reference to FIG. 10. In an image reading apparatus 100 (FIG. 10), in order to provide a space for stacking a plurality of media on a discharged-sheet receiving tray 101, the medium placement surface 101a of the discharged-sheet receiving tray 101 may be disposed under a discharge roller pair 103 with a space provided in the height direction between the media placement surface 101a and the discharge roller pair 103.

A medium discharging speed at which the discharge roller pair 103 discharges a medium varies in accordance with a speed of reading the medium in an image reading section (not shown) of the image reading apparatus 100. In the case that the medium discharging speed of the discharge roller pair 103 is high, when the trailing edge of a medium exits the discharge roller pair 103, the medium lands on the discharged-sheet receiving tray 101 more downstream in the discharge direction (+Y direction) due to the high discharge speed (for example, see sheet P1 in FIG. 10).

On the other hand, in the case that the medium discharging speed of the discharge roller pair 103 is low, when the trailing edge of the medium exits the discharge roller pair 103, the medium lands on the discharged-sheet receiving tray 101 almost immediately below the discharge roller pair 103. In this case, the trailing edge of the medium remains in an apparatus body 102 and may curl up from time to time as does the sheet P2 in FIG. 10. There was cases that the curling up of the trailing edge lead to a problem, such as jamming of subsequent media. Such a problem tended to occur particularly when a medium was weak, or had low rigidity, such as in the case of a thin sheet.

SUMMARY

An advantage of some aspects of the invention is that the likelihood of a medium jamming is reduced or avoided during discharging media to a discharged-sheet receiving tray and a plurality of media are appropriately discharged to, and stacked on, the discharged-sheet receiving tray.

An image reading apparatus according to a first aspect of the invention includes an apparatus body including a reading section that reads—a medium; a discharge device that is provided inside the apparatus body and discharges the medium after reads in the reading section; and a media receiving tray that has a placement surface and receives the medium being discharged by the discharge device. In the image reading apparatus, the media receiving tray has a first member that supports the medium being discharged, and the first member has at least a portion that is located inside the apparatus body and supports the medium at a position higher than the placement surface of the media receiving tray.

According to this configuration, the first member has at least a portion that is located inside the apparatus body and can support the medium at a position higher than the placement surface of the media receiving tray. This can reduce the likelihood of the trailing edge of a discharged medium curling up at a position near the discharge device in the medium-discharging direction. This can also reduce the likelihood of jamming of subsequent media, and thus a plurality of media can be appropriately stacked on the media receiving tray.

It is preferable that in the image reading apparatus, the first member have at least a portion that overlaps a position of the discharge device in a medium-discharging direction.

According to this configuration, the first member is provided at a position closer to the discharge device so that the above described effects can be obtained more reliably.

It is preferable that in the image reading apparatus, the apparatus body have an end portion that includes a discharge section for discharging the medium from the apparatus body, and that the first member be disposed between the discharge device and the end portion in a medium-discharging direction.

With this configuration, the likelihood of curling up of the trailing edge of the discharged medium can be reduced more reliably at a position between the discharge device and the end portion that includes the discharge section for discharging the medium from the apparatus body.

It is preferable that in the image reading apparatus, the first member be at least provided at a position closer to a center of the media receiving tray in a width direction thereof, the width direction intersecting a medium-discharging direction.

According to this configuration, the first member is at least provided at a position closer to a center of the media receiving tray in a width direction that intersects the medium-discharging direction. This can further reduce the likelihood of curling up of the trailing edge of the discharged medium.

It is preferable that in the image reading apparatus, the first member be formed at least partially as a prism that has a bottom surface shaped like a rectangle or a square.

With this configuration, the same effects as described above can be obtained by the first member, which is formed at least partially as a prism that has a bottom surface shaped like a rectangle or a square.

It is preferable that in the image reading apparatus, the first member be formed so as to be attached to, and detached from, the media receiving tray.

When the medium is, for example, a medium that is as rigid as a thick sheet of paper, the trailing edge of the medium does not curl easily even if the first member is not provided. In this case, according to this configuration, removing the first member enables the media receiving tray to provide more space for a larger number of media to be placed thereon.

It is preferable that in the image reading apparatus, the first member be configured to be installed alternatively at two installation positions that includes a first installation position where at least a portion of the first member is located inside the apparatus body on the media receiving tray and a second installation position that is located in the image reading apparatus and different from the first installation position, and that the first member serve as a packing member when the first member is installed at the second installation position.

According to this configuration, the first member, which is provided on the media receiving tray to support the medium and serve to restrain the trailing edge of the medium from curling, can be utilized as a packing member. Packing members are normally thrown away after a product is unpacked. However, packing members can be utilized to serve as the first members, which leads to reduction in the number of parts and therefore to reduction in manufacturing cost. In addition, this can make the image reading apparatus a desirable apparatus from a recycling point of view.

It is preferable that the image reading apparatus further include a media setting section that is provided upstream of the reading section, the medium to be fed toward the reading section being set in the media setting section, and an opening/closing body capable of opening/closing a portion of the apparatus body that includes the media setting section. In the image reading apparatus, the second installation position is located inside a region that the opening/closing body opens/closes.

With this configuration, the first member can be utilized as a packing member that is installed inside the region that is opened/closed by the opening/closing body capable of opening/closing a portion of the apparatus body that includes the media setting section.

It is preferable that in the image reading apparatus, the second installation position be at least provided at a position closer to a center in a width direction in the region that the opening/closing body opens/closes. With this configuration, the first member can function as the packing member more effectively.

It is preferable that in the image reading apparatus, the number of second installation positions correspond to the number of first installation positions.

With this configuration, when the first member is removed from a first installation position, a second installation position can be utilized as a storage space for the first member. This can reduce the likelihood of losing the first member that has been removed.

It is preferable that in the image reading apparatus, a metal plate be provided at a position where the first member is installed.

With this configuration, the first member can be installed at the installation position by using the magnet. Installing the first member at the installation position by using the magnet facilitates attachment/detachment of the first member.

It is preferable that in the image reading apparatus, the first member have a magnet disposed at a bottom of the first member.

With this configuration, the magnet at the bottom of the first member is attached, due to magnetic attraction, to the metal plate provided at the installation position for the first member. This can facilitate attachment/detachment of the first member to and from a predetermined installation position.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
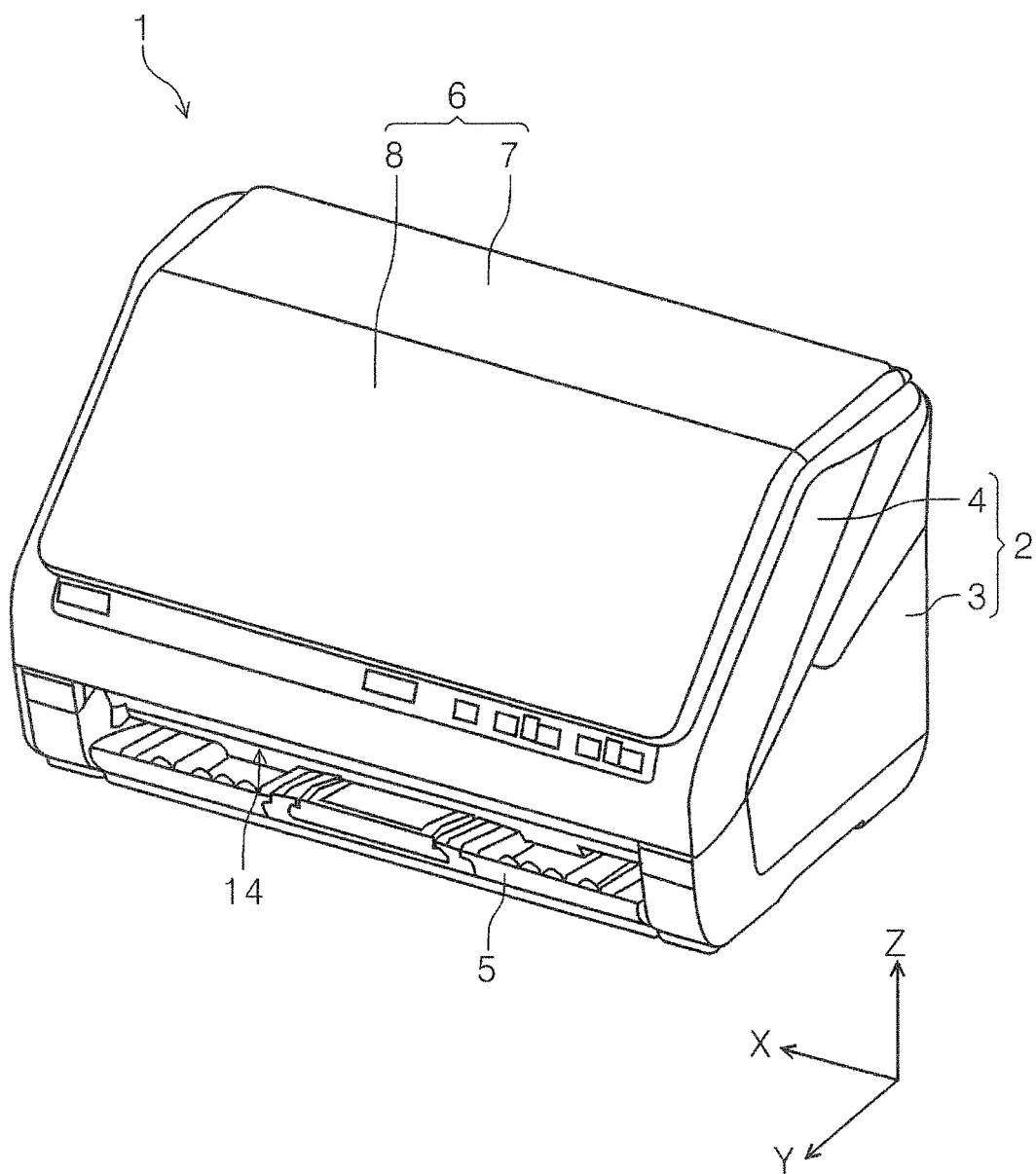
FIG. 1 is a perspective view illustrating an example of a scanner according to the invention.
Figure 2:
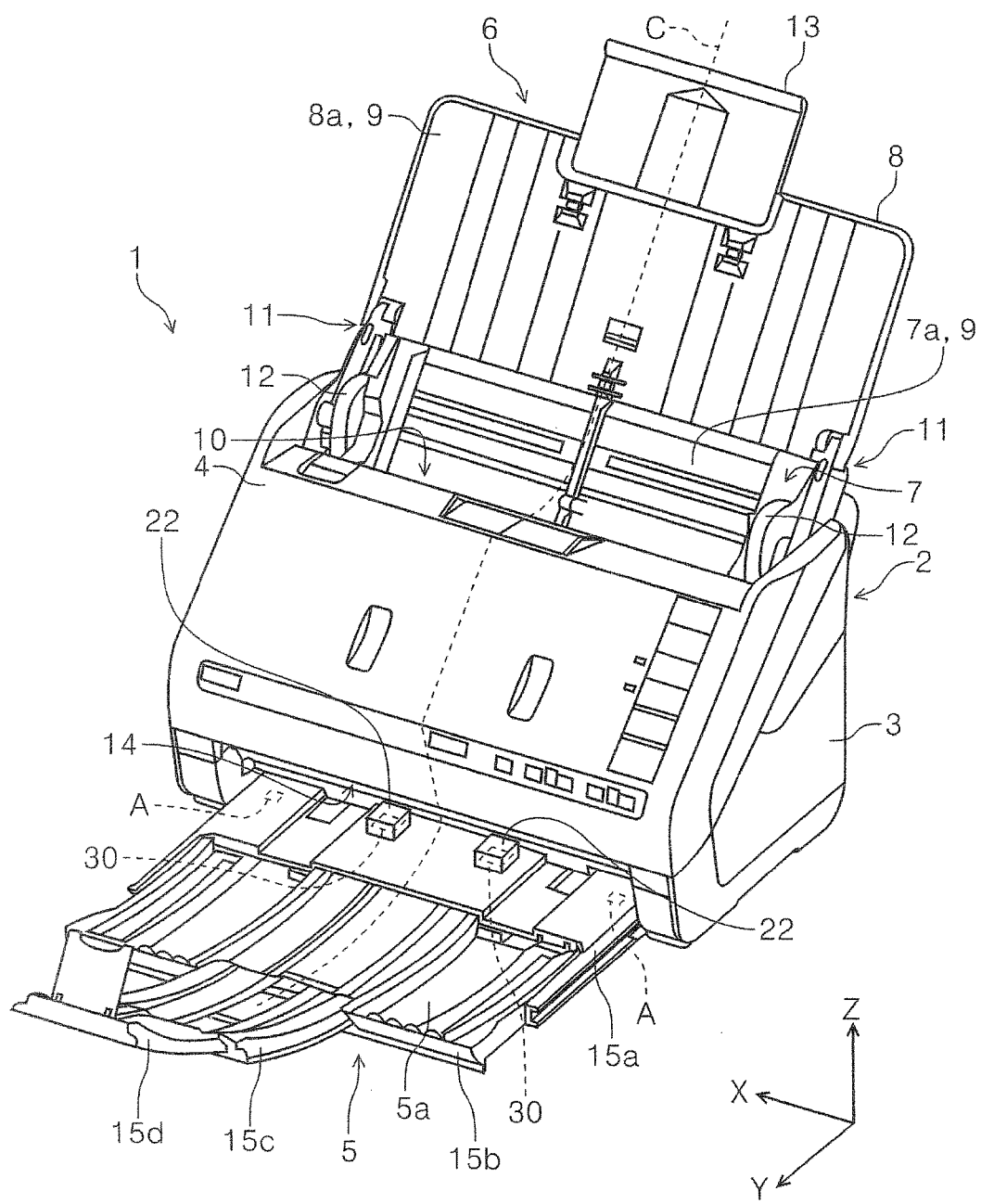
FIG. 2 is a perspective view illustrating a feedable state of the scanner according to the invention.
Figure 3:
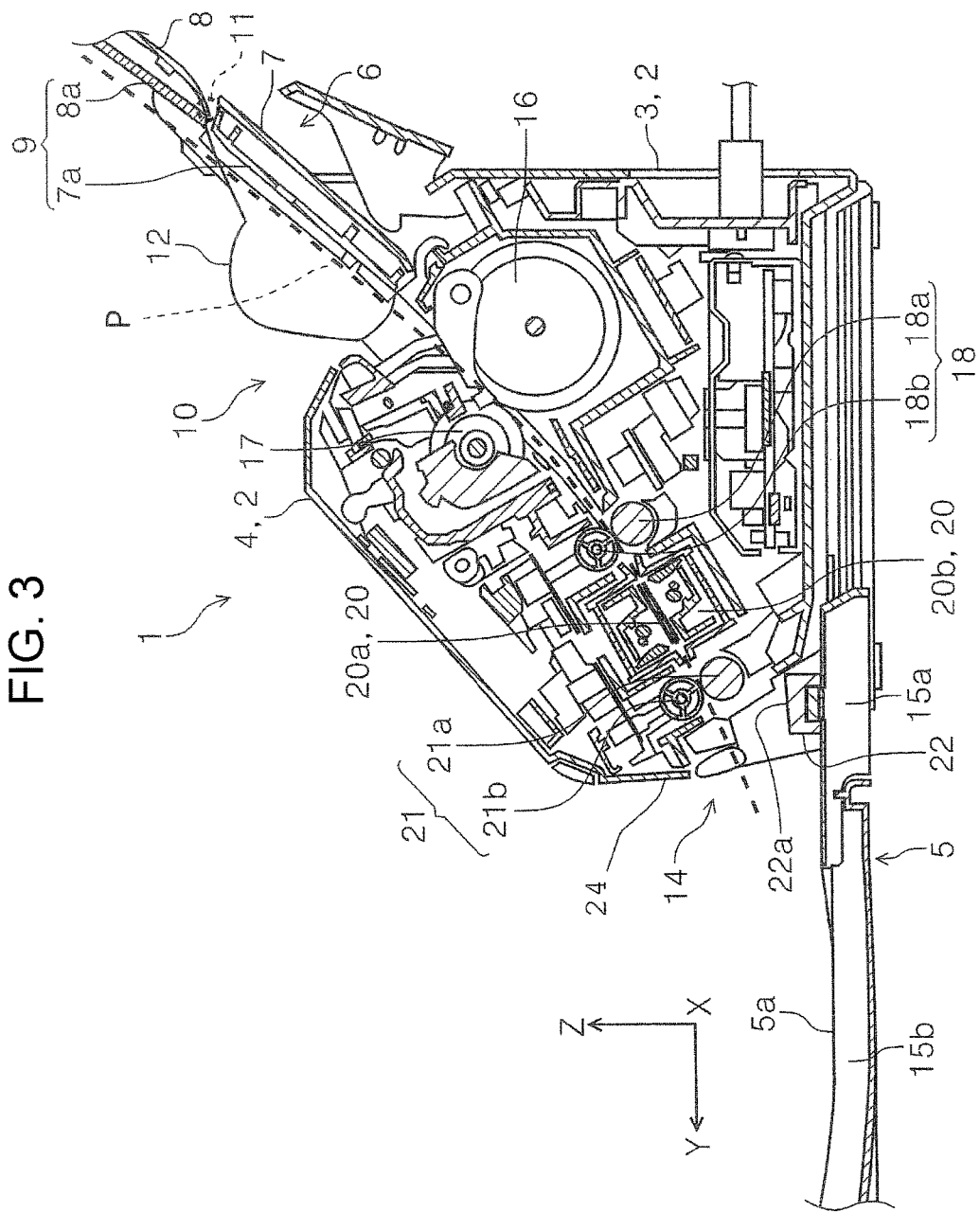
FIG. 3 is a cross-sectional side view illustrating the scanner in FIG. 2 and also a view illustrating a sheet transport path.
Figure 4:
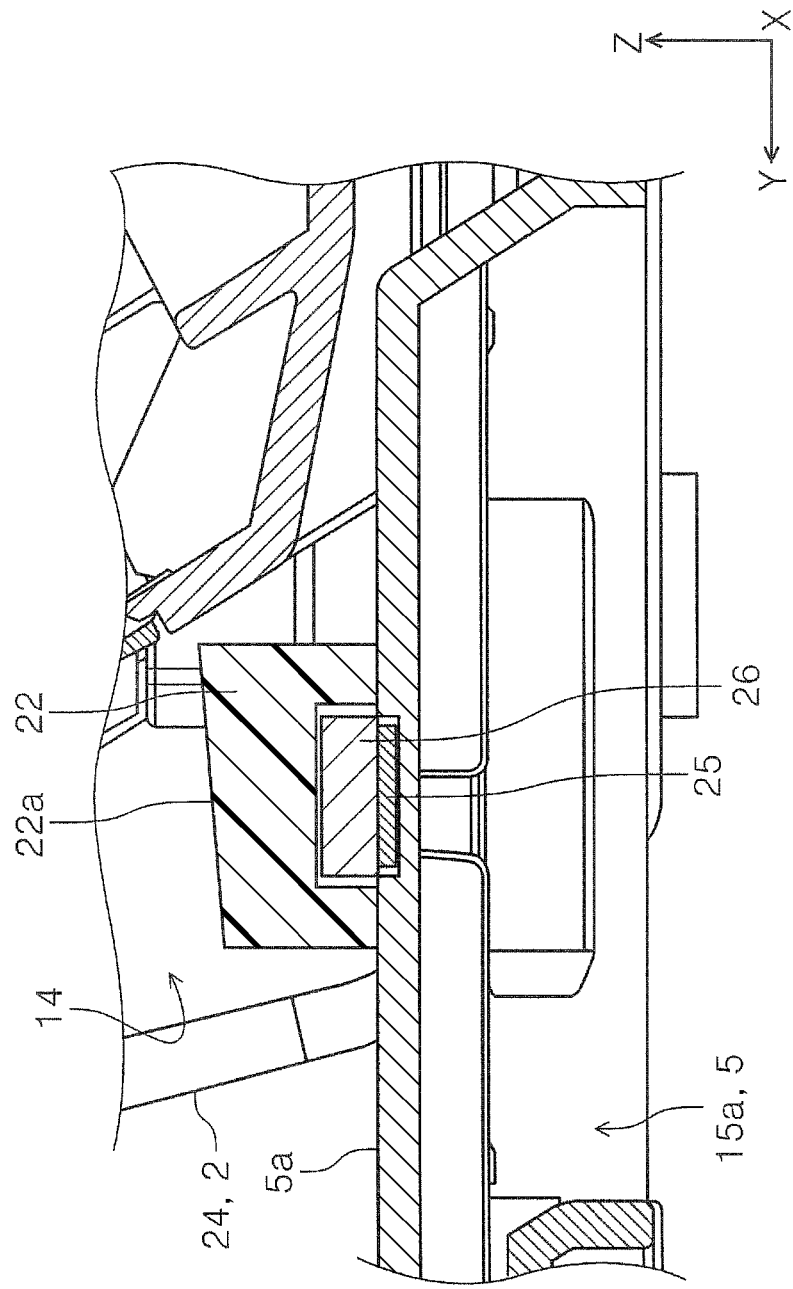
FIG. 4 is an enlarged view illustrating part of the scanner in FIG. 3.
Figure 5:
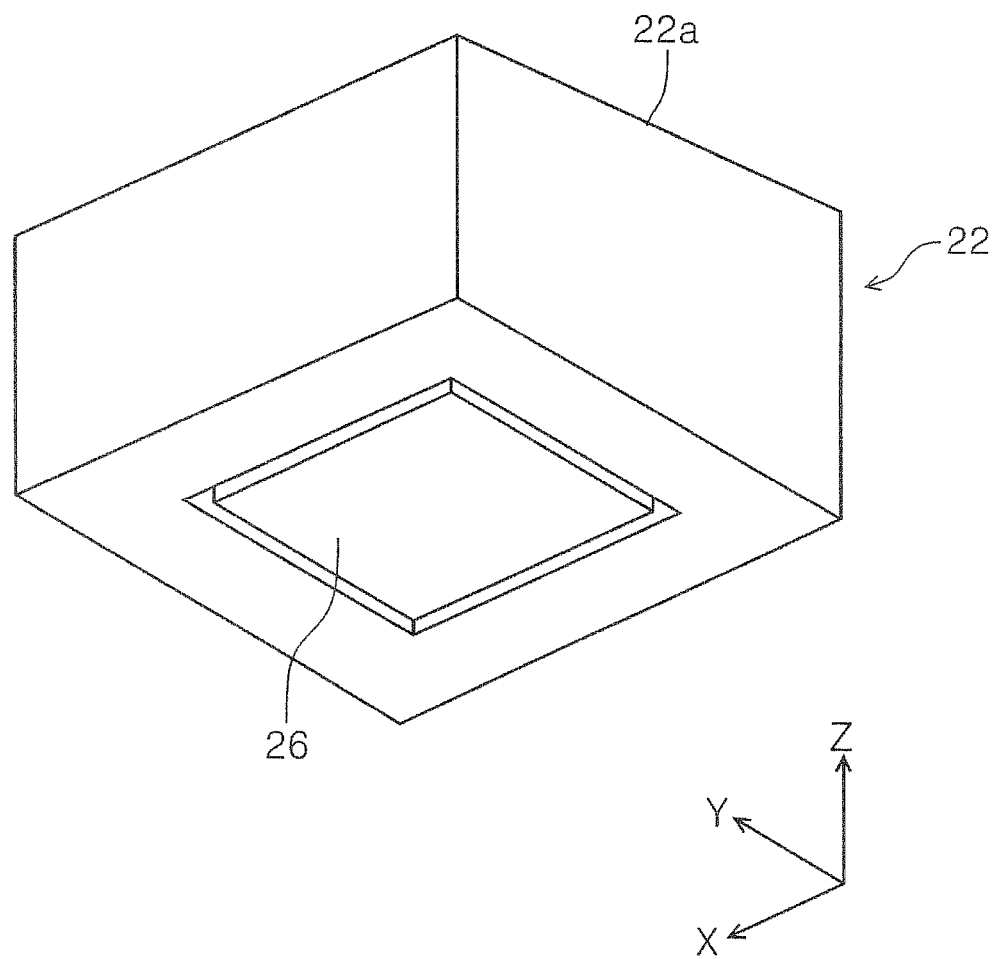
FIG. 5 is a perspective view illustrating a first member.
Figure 6:
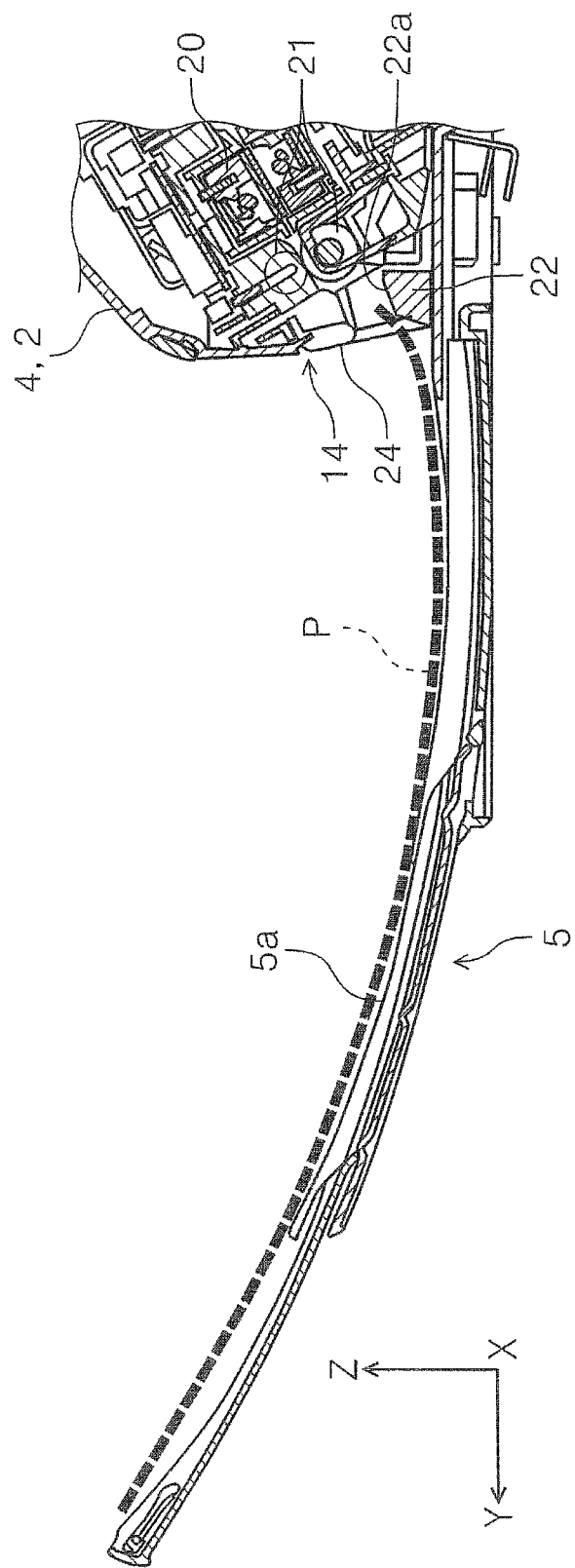
FIG. 6 is a cross-sectional side view illustrating a discharge section and its vicinity and a discharged sheet tray of the scanner in FIG. 2.
Figure 7:
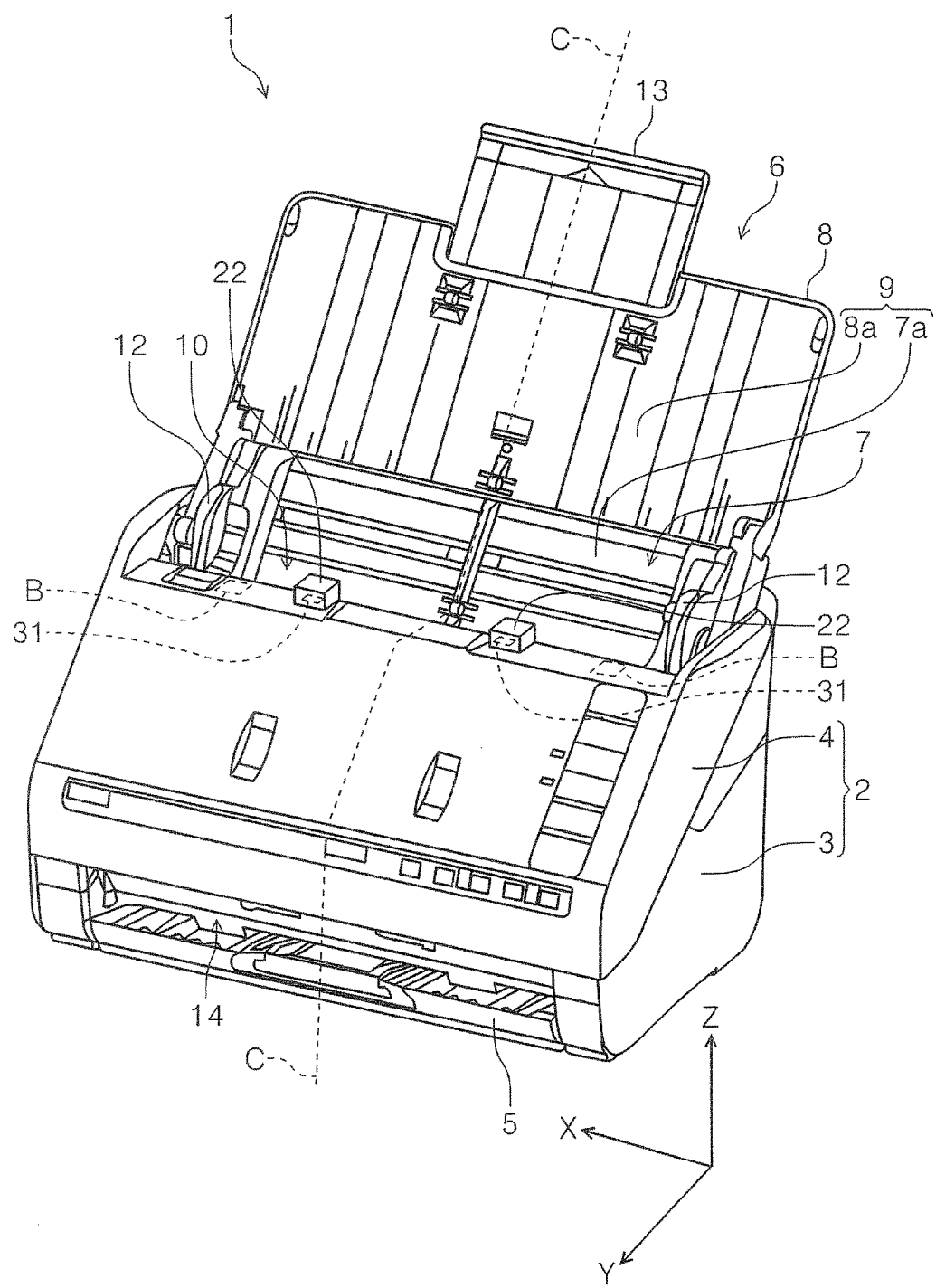
FIG. 7 is a perspective view illustrating a state in which the first member is installed at a second installation position in the scanner according to the invention.
Figure 8:
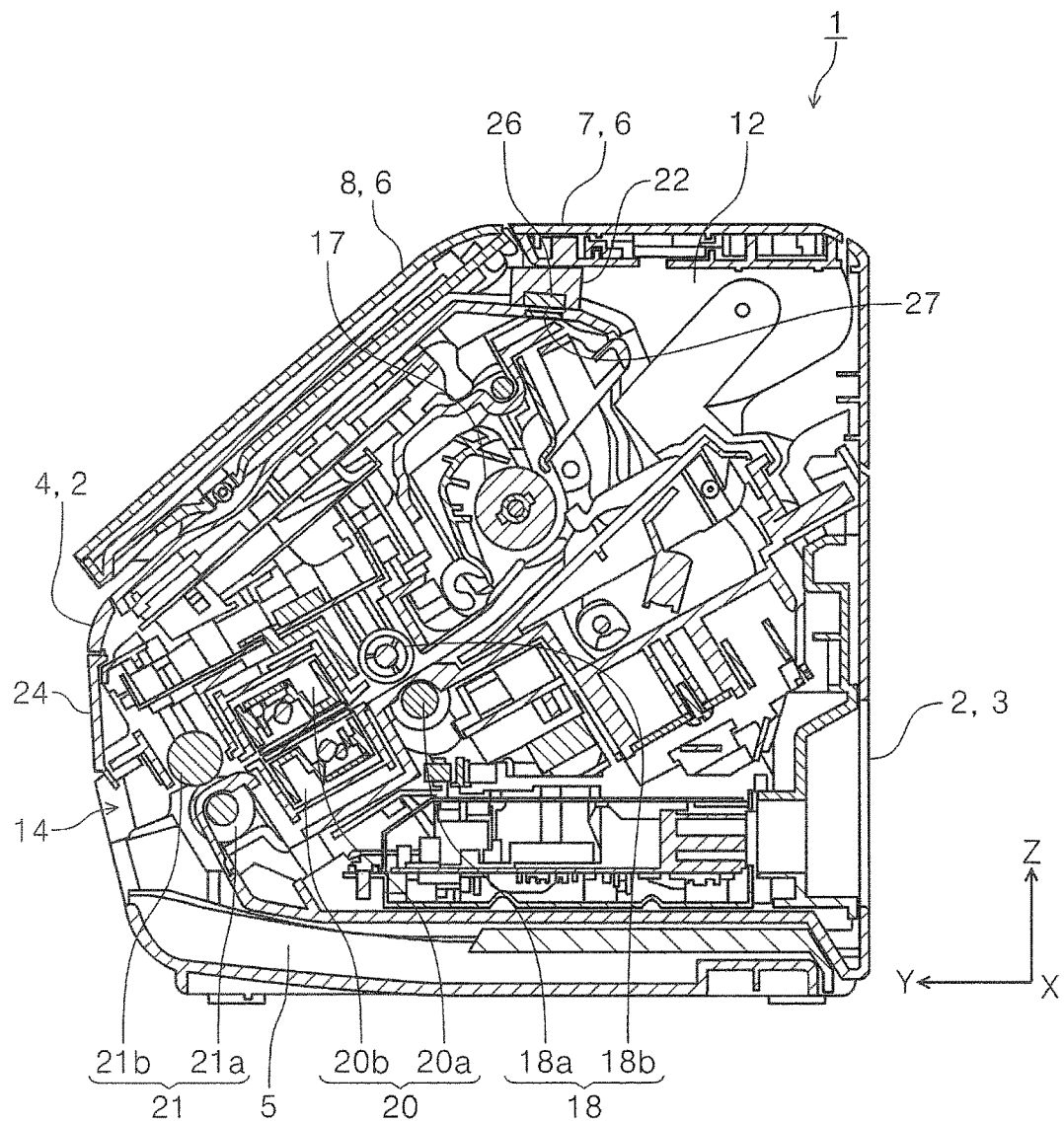
FIG. 8 is a cross-sectional side view illustrating a state in which a top cover of the scanner in FIG. 7 is closed.
Figure 9:
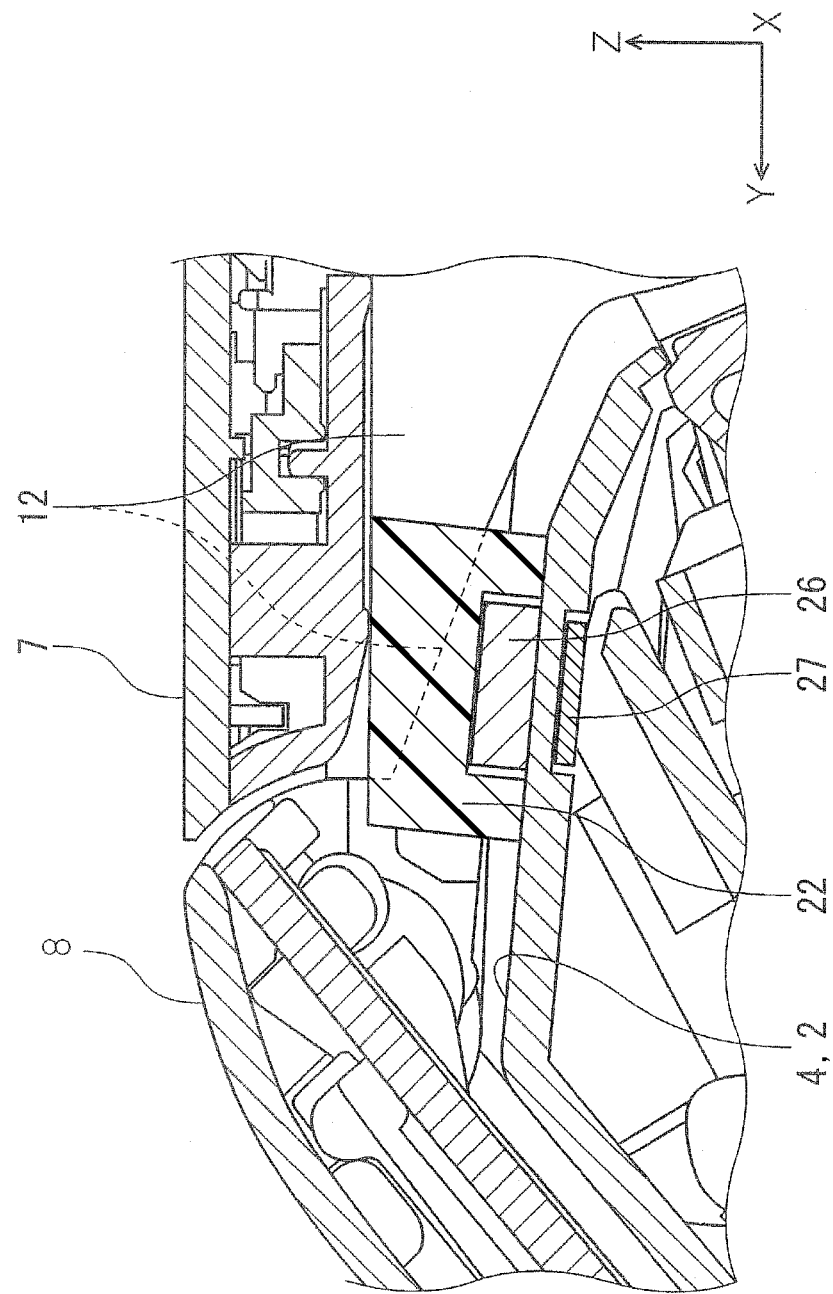
FIG. 9 is an enlarged view illustrating part of the scanner in FIG. 8.
Figure 10:
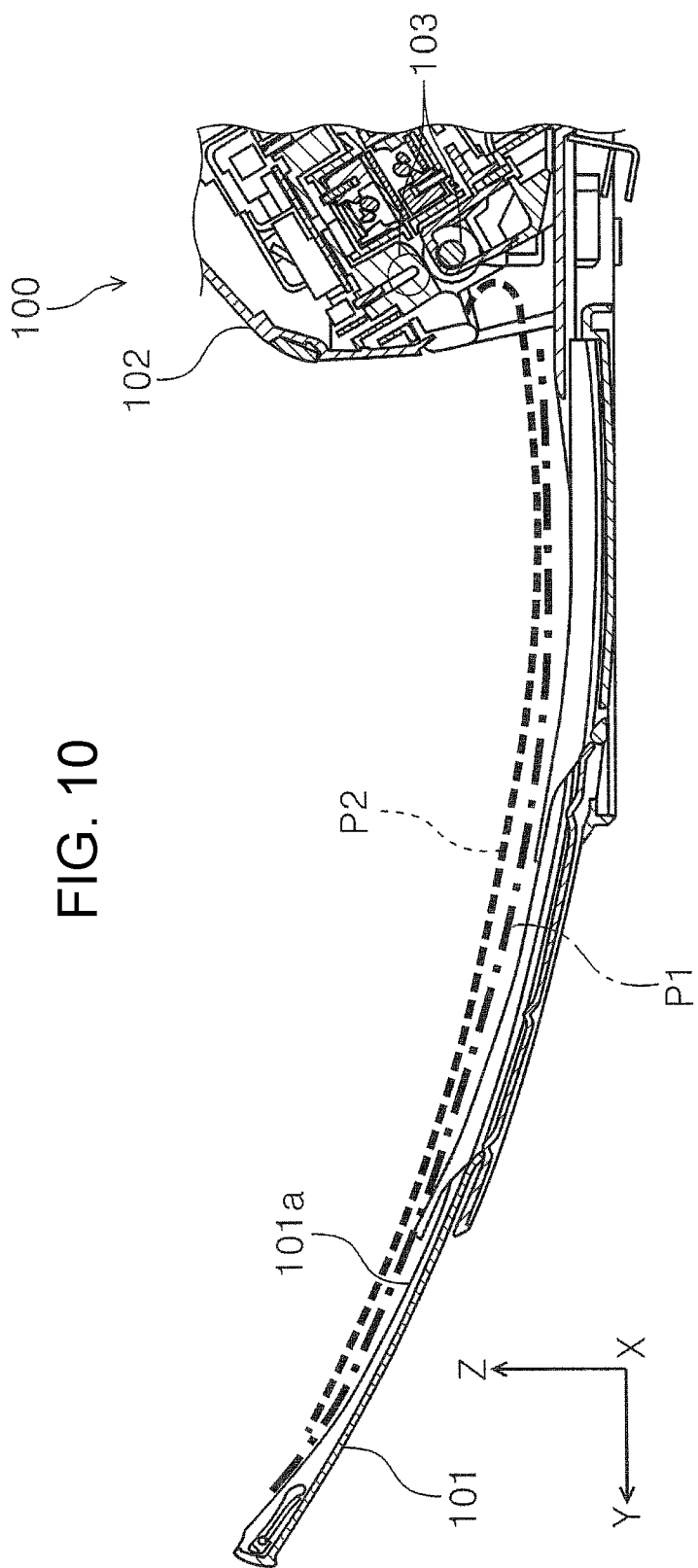
FIG. 10 is a view illustrating an example of the known art.

First, an image reading apparatus according to one embodiment of the invention will be outlined. As an example of the image reading apparatus according to the present embodiment, a document scanner 1 (hereinafter simply referred to as a "scanner 1") that can read at least one of the front and back sides of a medium will be described. FIG. 1 is a perspective view illustrating an example of a scanner 1 according to the invention. FIG. 2 is a perspective view illustrating a feedable state of the scanner 1 according to the invention. FIG. 3 is a cross-sectional side view illustrating the scanner 1 according to the invention and also a view illustrating a sheet transport path. FIG. 4 is an enlarged view illustrating part of the scanner in FIG. 3. FIG. 5 is a perspective view illustrating a first member. FIG. 6 is a cross-sectional side view illustrating a discharge section and its vicinity and a discharged sheet tray of the scanner 1 in FIG. 2. FIG. 7 is a perspective view illustrating a state in which the first member is installed at a second installation position in the scanner 1 according to the invention. FIG. 8 is a cross-sectional side view illustrating a state in which a top cover of the scanner in FIG. 7 is closed. FIG. 9 is an enlarged view illustrating part of the scanner in FIG. 8. FIG. 10 is a view illustrating an example of the known art.

Note that in the X-Y-Z coordinate system indicated in each of the drawings, the X direction represents the width direction of the apparatus and the width direction of sheets, the Y direction represents the depth direction of the apparatus, and the Z direction represents the height direction of the apparatus. Also note that the side of the apparatus in the +Y direction is the front side, and the side in the −Y direction is the rear side. When viewed from the front of the apparatus, the left side of the apparatus is the side in the +X direction, and the right side is the side in the −X direction. In addition, the side of the apparatus in the +Z direction is the top of the apparatus (including a top portion, the top surface, etc.), and the side in the −Z direction is the bottom of the apparatus (including a bottom portion, the bottom surface, etc.).

In the scanner 1, the sheet transport direction declines from an upper portion of the rear side of the apparatus toward a lower portion of the front side of the apparatus. However, the scanner is configured such that sheets of paper are transported substantially from the rear side of the apparatus toward the front side, and thus the Y direction is also referred to as the sheet transport direction. As used herein, the direction in which sheets of paper P (sheets P) are transported (i.e., +Y direction) is referred to as "downstream", and the opposite direction (i.e., −Y direction) is referred to as "upstream".

Overview of Scanner

The scanner 1 (FIG. 1) according to the invention includes an apparatus body 2 that has a reading section 20 (see FIG. 3) that reads an image of a sheet P, which serves as a medium. The apparatus body 2 also includes a top cover 6 that serves as an opening/closing body that opens/closes with respect to the apparatus body 2 and a discharged sheet tray 5 that serves as a media receiving tray that receives sheets P discharged from the apparatus body 2. A discharge roller pair 21 (FIG. 3) is provided inside the apparatus body 2. The discharge roller pair 21 serves as a discharge device that discharges sheets P that have been read in the reading section 20 (FIG. 3). The sheets P, which have been read in the reading section 20 and discharged from within the apparatus body 2 by the discharge roller pair 21, are placed on the discharged sheet tray 5.

The apparatus body 2 is formed of a lower unit 3 and an upper unit 4. The upper unit 4 is turnably joined to the lower unit 3 with a pivot positioned on the downstream side of the upper unit 4 in the sheet transport direction. When the upper unit 4 is opened toward the front of the apparatus with respect to the lower unit 3, a sheet transport path for sheets P is exposed. The upper unit 4 and the lower unit 3 are thus formed so as to facilitate operations for recovery from jamming of a sheet P and maintenance of a feed roller, a transport roller pair 18, and so on (to be described below).

A media setting section 10 (FIGS. 2 and 3) is provided at a top portion of the apparatus body 2. As illustrated in FIG. 3, the media setting section 10 is provided upstream of the reading section 20. Documents (sheets P) that will be fed into the reading section 20 are set in the media setting section 10. Two edge guides 12 (FIG. 2) are provided on the back side 7a of a first cover portion 7 that constitutes a support portion 9. The edge guides 12 guide the ends, in the width direction (in the X direction), of sheets P that are set in the media setting section 10. The edge guides 12 are formed to be slidable in the X direction so as to align with sheets P having different widths.

The top cover 6, which is disposed at the top of the apparatus body 2, opens/closes an upper portion of the upper unit 4 that includes the media setting section 10. The top cover 6 is formed of the first cover portion 7 and a second cover portion 8. The first cover portion 7 is joined to the second cover portion 8 via a pivot 11 (FIG. 2). The first cover portion 7 is also joined to the lower unit 3 so as to be rotatable with respect to an upper portion of the rear side of the lower unit 3.

The top cover 6 can assume a feedable state and a non-feedable state. In the non-feedable state, as illustrated in FIG. 1, the top cover 6 covers the top of the upper unit 4 and the media setting section 10 (FIG. 2, FIG. 3). As illustrated in FIG. 2, the top cover 6 in the non-feedable state illustrated in FIG. 1 is turned toward the rear side of the apparatus so that the top cover 6 assumes the feedable state. In the feedable state, the top cover opens to provide access to the media setting section 10, and the back sides of the top cover 6 (i.e., the back side 7a of the first cover portion 7 and the back side 8a of the second cover portion 8) serve as the support portion 9 (paper support) for supporting sheets P, thereby enabling sheets P to be set in the media setting section 10.

The top cover 6 is formed such that in the feedable state illustrated in FIG. 2, the top cover 6 opens such that the back side 7a of the first cover portion 7 is flush with the back side 8a of the second cover portion 8. In the non-feedable state illustrated in FIG. 1, the second cover portion 8 turns about the pivot 11 in the cover-closing direction and the top cover 6 fits the shape of the top of the upper unit 4 and closes the upper unit 4. Incidentally, reference numeral 13 in FIG. 2 denotes an auxiliary paper support 13. The auxiliary paper support 13 is disposed such that it can be accommodated inside the second cover portion 8 and can be withdrawn therefrom.

A discharge section 14 and the discharged sheet tray 5 are provided on the front side of the lower unit 3. The discharge section 14 is an opening through which sheets P are discharged from the apparatus body 2, and the discharged sheet tray 5 receives the sheets P discharged from the discharge section 14. The sheets P are discharged from the discharge section 14 by the discharge roller pair 21 provided inside the apparatus body 2.

The discharged sheet tray 5 can assume a state in which it is accommodated in the discharge section 14 as illustrated in FIG. 1 or another state in which it is withdrawn from the discharge section 14 to the front of the apparatus as illustrated in FIG. 2. In the embodiment, the discharged sheet tray 5 is formed of a plurality of tray members 15a, 15b, 15c, and 15d joined to each other, and the withdrawal length of the discharged sheet tray 5 from the discharge section 14 is adjustable in accordance with the length of sheets P to be discharged. Note that the discharged sheet tray 5 is not limited to the withdrawal type (otherwise called "insertion type" or "telescopic type") as is in the embodiment, but may be a collapsible type in which a plurality of tray members are folded when stored and unfolded and adjusted in length when used.

A first member 22 (FIG. 2) is provided on the discharged sheet tray 5. The first member 22 is disposed at a position where at least a portion of the first member 22 is located inside the apparatus body 2. The first member 22 will be described further after the sheet transport path in the scanner 1 is described.

Sheet Transport Path in Scanner

Next, a sheet transport path in the scanner 1 will be described with reference to FIG. 3. When the top cover 6 is in the position in which it is turned with respect to the lower unit 3 toward the rear side of the apparatus, sheets P to be set in the media setting section 10 are placed on, and supported by the support portion 9, which is the back side of the top cover 6 (i.e., the back side 7a of the first cover portion 7 and the back side 8a of the second cover portion 8). A plurality of sheets P can be set in the media setting section 10.

The sheets P placed on the support portion 9 are picked up and fed downstream (in the +Y direction) by a feed roller 16 that is rotatably disposed in the lower unit 3. More specifically, the feed roller 16 rotates such that the feed roller 16 is in contact with the back side of a sheet P, in other words, the side of the sheet P that faces the support portion 9, so as to feed the sheet P downstream. Thus, when a plurality of sheets P are set in the media setting section 10 of the scanner 1, the sheets P are fed downstream one by one starting with the sheet that faces the support portion 9. Note that the feed roller 16 is disposed such that a portion of the feed roller 16 protrudes into the sheet transport path.

A separation roller 17 is disposed in the upper unit 4 at a position opposing the feed roller 16. The separation roller 17 to which a predetermined rotational resistance is applied prevents feeding of multiple sheets. In case of two or more sheets P entering between the feed roller 16 and the separation roller 17, upper sheets are separated by the separation roller 17, and only the sheet in contact with the feed roller 16 is nipped by the feed roller 16 and the separation roller 17 and fed downstream in the sheet transport direction.

The transport roller pair 18, the reading section 20, and the discharge roller pair 21 are provided downstream of the feed roller 16 in the transport direction. In the embodiment, the discharge roller pair 21 includes a discharge drive roller 21a that is disposed in the lower unit 3 and a discharge idler roller 21b that is disposed in the upper unit 4. The discharge idler roller 21b passively rotates in accordance with the discharge drive roller 21a.

The sheet P, which has been nipped and fed downstream in the sheet transport direction by the feed roller 16 and the separation roller 17, is subsequently nipped by the transport roller pair 18 and transported to the reading section 20 that is located downstream of the transport roller pair 18. The transport roller pair 18 includes a transport drive roller 18a that is disposed in the lower unit 3 and a transport idler roller 18b that is disposed in the upper unit 4. The transport idler roller 18b passively rotates in accordance with the transport drive roller 18a.

Note that in the embodiment, the feed roller 16, the transport drive roller 18a and the discharge drive roller 21a are rotatably driven by a drive source (not shown) provided inside the lower unit 3. In addition, the feed roller 16, the separation roller 17, and the transport roller pair 18 are positioned in a central portion in the width direction (X direction), which intersects the medium transport direction. Thus, these rollers are positioned so as to perform so-called center feeding in which the sheet P is registered with respect to the center of the sheet P in the width direction. Accordingly, the discharge roller pair 21 is also provided at the central portion in the X direction.

The reading section 20 includes an upper reading sensor 20a that is disposed in the upper unit 4 and a lower reading sensor 20b that is disposed in the lower unit 3. In the embodiment, the upper reading sensor 20a and the lower reading sensor 20b are formed, for example, as contact image sensor modules (CISM).

After the reading section 20 reads an image on at least one of the front and back sides of the sheet P, the sheet P is nipped by the discharge roller pair 21 located downstream of the reading section 20 and discharged from the discharge section 14 toward the discharged sheet tray 5. Note that the dotted line in FIG. 3 represents transportation of a sheet P along the sheet transport path in the scanner 1.

First Member

As described above, the first member 22 (FIGS. 2 and 3) is provided on the discharged sheet tray 5 at a position where at least a portion of the first member 22 is located inside the apparatus body 2. The first member 22 is able to support media at a position higher than a placement surface 5a of the discharged sheet tray 5. Regarding the discharged sheet tray 5, as illustrated in FIG. 3, the discharge roller pair 21 and the placement surface 5a are arranged to have a distance therebetween in the height direction so that a space for stacking a plurality of sheets P is provided. Returning now to the known art illustrated in FIG. 10 by way of example, in a known discharged-sheet receiving tray 101 (corresponding to the discharged sheet tray 5) that does not have the first member 22, there have been cases in which the trailing edge of a sheet P remaining inside the apparatus body 2 has curled up, as does the sheet P2 in FIG. 10. This occurred when the trailing edge exiting a discharge roller pair 103 landed on the discharged-sheet receiving tray 101 almost directly below the discharge roller pair 103. The curled trailing edge of a sheet P that remains inside the apparatus body 2 may cause jamming of subsequent sheets.

In the embodiment, as illustrated in FIG. 6, the first member 22 can support the trailing edge of a sheet P at a position higher than the placement surface 5a of the discharged sheet tray 5 when the trailing edge of the sheet P that exits the discharge roller pair 21 lands on the discharged sheet tray 5 at a position where the trailing edge remains inside the apparatus body 2. When the trailing edge of the sheet P is supported by the first member 22 in this manner, the sheet P is warped along the trailing edge, which makes the sheet P sturdier and more resistant to curling up. Thus, the first member 22 can reduce the likelihood of the trailing edge of the discharged sheet P curling up at a position near the discharge roller pair 21 in the medium-discharging direction, thereby reducing the likelihood of subsequent sheets P jamming. Thus, a plurality of discharged sheets can be appropriately stacked on the discharged sheet tray 5.

Arrangement of First Member in Depth Direction

In the embodiment, as illustrated in FIG. 3, the first member 22 is provided such that at least a portion thereof overlaps the position of the discharge roller pair 21 in the medium-discharging direction (+Y direction). In this manner, the first member 22 can be disposed at a position closer to the discharge roller pair 21. Thus, even in the case that the sheet discharge speed of the discharge roller pair 21 is low and the sheet P is discharged such that the trailing edge of the sheet P lands directly below the discharge roller pair 21, the first member 22 can reliably support the trailing edge of the sheet P.

Moreover, as illustrated in FIG. 3, the first member 22 is provided, in the medium-discharging direction, between the discharge roller pair 21 and an apparatus-body end 24 that includes the discharge section 14 that discharges the sheet P from the apparatus body 2. The first member 22 reliably reduces the likelihood of the trailing edge of the sheet P curling up between the discharge roller pair 21 and the apparatus-body end 24.

Arrangement of First Member in Width Direction

The first member 22 is provided at a position close to at least the center of the discharged sheet tray 5 (FIG. 2) in the width direction (X direction), which intersects the medium-discharging direction. In this embodiment, two first members 22 are provided at symmetrical positions with respect to the center portion C. When the first members 22 are provided at positions closer to the center of the discharged sheet tray 5 in the width direction, and the trailing edge of a sheet P is supported at the positions closer to the center as in FIG. 6, the sheet P becomes even sturdier and more resistant to curling up. Thus, the likelihood of the trailing edge of a discharged sheet P curling up can be reduced more reliably. In the embodiment, two first members 22 are provided at positions closer to the center of the discharged sheet tray 5 in the width direction. Alternatively, one first member 22 may be provided at the center portion C or at a position immediately near the center portion C. Moreover, in addition to the first member 22 disposed at the position closer to the center, other first members 22 can be provided at both ends in the width direction (at positions demarcated by dotted lines and indicated by reference A in FIG. 2).

Installation of First Member to Discharged Sheet Tray

The first member 22 is formed so as to be detachably attached to the discharged sheet tray 5. When a sheet P is, for example, a medium that is as rigid as a thick sheet, the trailing edge of the sheet P does not curl easily even if the first member 22 is not provided. In this case, the first member 22 is removed so that more space is available for a larger number of media to be placed on the discharged sheet tray 5.

A magnet can be used for the installation of the first member 22 on the discharged sheet tray 5. In the embodiment, as illustrated in FIG. 4, a metal plate 25 is provided at a first installation position 30 (FIG. 2) that is the installation position of the first member 22 on the discharged sheet tray 5, and a magnet 26 is disposed at the bottom of the first member 22 (also see FIG. 5). Due to magnetic attraction between the magnet 26 at the bottom of the first member 22 and the metal plate 25, the first member 22 can be attached to the installation position (i.e., the first installation position 30) on the discharged sheet tray 5. Use of the magnet 26 and the metal plate 25 for installation of the first member 22 onto the discharged sheet tray 5 enables the first member 22 to be readily attached to or detached from the predetermined installation position.

Note that the metal plate can be provided in the first member 22 and the magnet is provided in the discharged sheet tray 5. Alternatively, the attachment of the first member 22 to the discharged sheet tray 5 can be achieved, instead of using a magnet, by engaging a male element of the first member 22 with a female element of the discharged sheet tray 5 (male-female relation can be switched). In addition, the first member 22 is not limited to have the configuration in which it is detachably installed on the discharged sheet tray 5, but may have a configuration in which the first member 22 is integrally formed in, or undetachably fixed to, the discharged sheet tray 5.

Alternative Installation Position of First Member

In the embodiment, the first member 22 is configured to be installed at two positions, in other words, at the first installation position 30 (FIGS. 2 and 3) where on the discharged sheet tray 5, at least a portion of the first member 22 is located inside the apparatus body 2, or at a second installation position 31 (FIGS. 7 and 8) that is different from the first installation position 30 in the scanner 1. A metal plate 27 (FIG. 9) is disposed at the second installation position 31, as is the case for the first installation position 30. Thus, the first member 22 that has been removed from the first installation position 30 (FIG. 2) can be attached, by magnetic attraction, to the second installation position 31.

When the first member 22 is installed at the first installation position 30 on the discharged sheet tray 5 as illustrated in FIG. 2, the first member 22 serves to support a sheet P being discharged and to restrain the trailing edge of the sheet P from curling (also see FIG. 6). When the first member 22 is moved from the first installation position 30 to the second installation position 31 and installed at the second installation position 31 as illustrated in FIG. 7, the first member 22 serves as a packing member for the scanner 1.

In the embodiment, as illustrated in FIGS. 7 and 8, the second installation positions 31 are provided inside the region covered by the top cover 6. More specifically, the second installation positions 31 are provided at positions that are near the media setting section 10 of the upper unit 4 and that oppose the first cover portion 7 that constitutes the top cover 6 when the top cover 6 is closed.

The two edge guides 12 are provided at corresponding ends, in the width direction, of the back side 7a of a first cover portion 7, as previously described. As illustrated in FIGS. 8 and 9, when the top cover 6 is closed, the edge guides 12 are accommodated between the first cover portion 7 and the upper unit 4. In this state, since the edge guides 12 are provided only at both ends in the width direction, a gap is created between the two edge guides 12 and between the first cover portion 7 and the upper unit 4. The gap being present between the first cover portion 7 and the upper unit 4 may cause the first cover portion 7 to be subjected to deformation, such as bending, when the scanner 1 is placed, for example, under a high temperature environment. Thus, the first members 22 are provided as the packing members at positions (the second installation positions 31) where the first members 22 can fill the gap between the first cover portion 7 and the upper unit 4 when the top cover 6 is closed.

Packing members are normally discarded after a product is unpacked. However, packing members can be utilized to serve as members (first members 22) for restraining the trailing edge of a discharged sheet P from curling, which leads to a reduction in the number of parts and consequently to a reduction in manufacturing costs. Moreover, such utilization can make the scanner 1 a desirable apparatus from a recycling point of view.

As illustrated in FIG. 5, the first member 22 is formed at least partially as a prism that has a bottom surface shaped like a rectangle or a square, which is a type of rectangle. An inclined surface 22a (FIGS. 4 and 5) is formed at the top of the first member 22 according to the embodiment, and the first member 22 is installed (see FIGS. 4 and 9) such that the inclined surface 22a declines in the discharge direction of the sheet P (in the +Y direction) regardless of whether the first member 22 is installed at the first installation position 30 or at the second installation position 31.

Forming the first member 22 as the prism as illustrated in FIG. 5 can make the first member 22 suitable for serving as a support for sheets P at the first installation position 30 on the discharged sheet tray 5 and as a packing member. The inclined surface 22a formed at the top of the first member 22 enables the first member 22 to smoothly support sheets P discharged by the discharge roller pair 21 when the first member 22 is installed at the first installation position 30 (discharged sheet tray 5), and also enables the first member 22 to appropriately fill the gap between the upper unit 4 and the first cover portion 7 when the first member 22 is installed at the second installation position 31 (upper unit 4). Note that provision of the inclined surface 22a is not necessary when the first member 22, installed at the first installation position 30 on the discharged sheet tray 5, supports sheets P discharged by the discharge roller pair 21.

The first member 22 may be formed, for example, of a rubber or a resin material. Alternatively, the first member 22 may be formed, for example, of urethane foam or styrene foam. When the first member 22 serves as a packing material, the first member 22 is preferably formed of a material softer (i.e., less rigid) than the top cover 6. The top cover 6 can be formed of a resin material, such as a plastic. As a packing material, the first member 22 is desirably formed of a material having elasticity, such as urethane foam or a rubber material.

As illustrated in FIG. 7, the second installation position 31 is at least provided at a position closer to the center in the width direction (in the X direction) in the region that the top cover 6 opens/closes. In the embodiment, two second installation positions 31 are arranged substantially symmetrically with respect to the center portion C of the upper unit 4 (apparatus body 2). The first members 22 thereby function as the packing members more effectively and efficiently prevent the first cover portion 7 from warping at a position between the two edge guides 12. In the embodiment, two second installation positions 31 are arranged substantially symmetrically with respect to the center portion P of the upper unit 4. However, one second installation position 31 can be provided at the center portion C or at a position near the center portion C. Moreover, in addition to the second installation position 31 provided closer to the center, first members 22 can be installed at other second installation positions 31 that are provided at both ends in the width direction (at positions surrounded by dotted lines and indicated by reference B in FIG. 7).

It is preferable that the number of the second installation positions 31 correspond to the number of the first installation positions 30. In other words, the number of the first installation positions 30 and the number of the second installation positions 31 are preferably the same. In the embodiment, two first installation positions 30 and two second installation positions 31 are provided (FIGS. 2 and 7). In the case that the number of the first installation positions 30 and the number of the second installation positions 31 are the same, the second installation positions 31 can be utilized as storage spaces for the first members 22 when they are removed from the first installation positions 30. This can reduce the likelihood of losing the first members 22 that have been removed.

The second installation positions 31 for the first members 22 that are used as the packing members are not limited to the positions according to the embodiment. Moreover, installation positions for the first members 22 that are used as packing members may be provided at multiple locations, such as, for example, the second installation positions 31 as in the embodiment and other installation positions. Even in this case, the total number of the installation positions for the first members 22 that are used as packing members is preferably the same as the number of the first installation positions 30.

Note that the invention is not limited to the embodiments described above and various modifications can be made, and thereby included, within the scope of the invention set forth in the claims.

The entire disclosure of Japanese Patent Application No. 2016-245541, filed Dec. 19, 2016 is expressly incorporated by reference herein.

What is claimed is:

1. An image reading apparatus, comprising:
   an apparatus body including a reading section that reads a medium;
   a discharge device that is provided inside the apparatus body and discharges the medium after reads in the reading section; and
   a media receiving tray that has a placement surface and receives the medium being discharged by the discharge device, wherein
   the media receiving tray has a first member that supports a bottom surface of the medium being discharged, and
   the first member has at least a portion that is located inside the apparatus body and supports the medium at a position higher than the placement surface of the media receiving tray.

2. The image reading apparatus according to claim 1, wherein the first member has at least a portion that overlaps a position of the discharge device in a medium-discharging direction.

3. The image reading apparatus according to claim 1, wherein
   the apparatus body has an end portion that includes a discharge section for discharging the medium from the apparatus body, and
   the first member is disposed between the discharge device and the end portion in a medium-discharging direction.

4. The image reading apparatus according to claim 1, wherein the first member is provided at least at a position closer to a center of the media receiving tray in a width direction thereof, the width direction intersecting a medium-discharging direction.

5. The image reading apparatus according to claim 1, wherein the first member is formed at least partially as a prism that has a bottom surface shaped like a rectangle or a square.

6. The image reading apparatus according to claim 1, wherein the first member is formed so as to be attached to, and detached from, the media receiving tray.

7. The image reading apparatus according to claim 6, wherein
   the first member is configured to be changeably installed at two installation positions that include
     a first installation position where at least a portion of the first member is located inside the apparatus body on the media receiving tray and
     a second installation position that is located in the image reading apparatus and different from the first installation position, and
   the first member serves as a packing member when the first member is installed at the second installation position.

8. The image reading apparatus according to claim 7, further comprising:
   a media setting section that is provided upstream of the reading section, the medium to be fed toward the reading section being set in the media setting section, and
   an opening/closing body capable of opening/closing a portion of the apparatus body that includes the media setting section, wherein
   the second installation position is located inside a region that the opening/closing body opens/closes.

9. The image reading apparatus according to claim 8, wherein the second installation position is provided at least at a position closer to a center in a width direction in the region opened/closed by the opening/closing body.

10. The image reading apparatus according to claim 6, wherein the number of second installation positions corresponds to the number of first installation positions.

11. The image reading apparatus according to claim 6, wherein a metal plate is provided at a position where the first member is installed.

12. The image reading apparatus according to claim 11, wherein the first member has a magnet disposed at a bottom thereof.

* * * * *